(12) United States Patent
Yankielun et al.

(10) Patent No.: US 6,909,669 B1
(45) Date of Patent: Jun. 21, 2005

(54) SCOUR DETECTION AND MONITORING APPARATUS ADAPTED FOR USE IN LOSSY SOILS AND METHOD OF EMPLOYMENT THEREOF

(75) Inventors: Norbert E. Yankielun, Lebanon, NH (US); Leonard Zabilansky, Perkinsville, VT (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/293,781

(22) Filed: Apr. 19, 1999

(51) Int. Cl.$^7$ ............................................... H04B 17/00
(52) U.S. Cl. ......................... 367/131; 367/178; 367/13
(58) Field of Search ................................ 367/131, 178, 367/13; 73/594, 628; 405/73

(56) References Cited

U.S. PATENT DOCUMENTS

| | | | |
|---|---|---|---|
| 4,855,966 A | | 8/1989 | Cinquino ..................... 367/99 |
| 5,032,794 A | * | 7/1991 | Ridd et al. ................... 324/365 |
| 5,479,724 A | | 1/1996 | Nahajski et al. .............. 33/719 |
| 5,532,687 A | | 7/1996 | Richardson et al. ... 340/870.33 |
| 5,726,578 A | * | 3/1998 | Hook .......................... 324/643 |
| 5,753,818 A | | 5/1998 | Mercado ...................... 73/594 |
| 5,784,338 A | | 7/1998 | Yankielun et al. .......... 367/131 |
| 5,790,471 A | | 8/1998 | Yankielun et al. ............ 367/13 |
| 6,084,393 A | | 7/2000 | Yankielun |
| 6,100,700 A | | 8/2000 | Yankielun et al. |

OTHER PUBLICATIONS

Lagasse et al., "Scour Monitoring Devices for Bridges", Transportation Research Board, Third Bridge Engineering Conference, vol. 2, #1290, 1991.*

Zabilansky, L.J. , *Ice Force and Scour Instrumentation for the White River, Vermont*, U.S. Army Corps of Engineers, Cold Regions Research and Engineering Laboratory, Hanover, Mt. Special Report 96–6, Apr. 1996.

Dowding, C.J, and C.E. Pierce , *Use of Time Domain Reflectometry to Detect Bridge Scour and Monitor Pier Movement*, United States Department of Interior Bureau of Mines, Symposium and Workshop on Time Domain Reflectometry in Environmental, Infrastructure and Mining Applications, Northwestern University, Illinois, Sep. 7–9, 1994, pp. 579–587.

* cited by examiner

Primary Examiner—Ian J. Lobo
(74) Attorney, Agent, or Firm—Earl H. Baugher, Jr.

(57) ABSTRACT

A sensor for detecting and monitoring scour in sediment positioned beneath a body of water, which includes a probe at least partially embedded in the sediment. Sensor electronics are superimposed on the probe. Such electronics include a reflectometer, a battery supply and a telemetry transmitter to display an interface boundary between the water and the transmitter. The sensor is particularly well adapted for use in lossy soils.

23 Claims, 3 Drawing Sheets

SCOUR DETECTION AND MONITORING APPARATUS ADAPTED FOR USE IN LOSSY SOILS AND METHOD OF EMPLOYMENT THEREOF

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to methods and apparatus for testing and monitoring, and more particularly, to means for detecting and monitoring scour in bridge piers and similar structures.

2. Brief Description of the Prior Art

Bridge scour is a severe problem that costs millions of dollars in terms of damage, loss of life and required maintenance annually, and leaves infrastructure, including bridge piers and docks in unsafe conditions. Scour occurs during times of rapid river flow and icing conditions when sediments, including rocks, gravel and silt are transported by the currents away from bridge piers and similar structures. If the event is severe enough, foundation material below the pier footing may be eroded, leaving the structure unsupported and in jeopardy of collapse. Scour is dynamic; ablation and deposition can occur during the same high-energy river event, so the net effect cannot be easily predicted.

While there are several current techniques available for measuring or monitoring scour, most have severe weaknesses. Radar has been employed successfully to bathymetrically determine scour conditions. The technique is usually applied after an event, indicating the final status of the sedimentation surrounding a pier. Sonar techniques have been similarly applied. Neither of these techniques are continuously employed in situ during a scour event; both require skilled operators to perform the test and interpret the results. Both methods are not particularly successful when there is rubble, ice or debris covering the water.

Neutral buoyancy "fish" equipped with a seismic transducer and radio transmitter have been anchored at varying depths in the sediments around bride piers (Zabilansky, 1996). As these "fish" are uncovered by the scouring process and are caused to move by the currents, their radio transmitter signals a receiver. on shore that the scour has reached their tethered depth. During a depositional event, the "fish" are re-buried at approximately their original depth. While this system is re-settable, it still gives a fairly crude spatial indication of the scour progression. The "fish" are battery powered and thus have a limited active life and must be replaced seasonally.

A time domain reflectometry technique has been suggested in the literature (Dowding and Pierce, 1994). This system uses a sacrificial sensor buried vertically in the sediments. Once a section of the sensor is exposed to scouring, the currents causes the exposed section to be broken off, shortening the sensor. This shortening of the sensor can be detected and measured with an on-shore instrument. The drawback of such a system is that the sensor is sacrificial, i.e. destroyed in the measurement process, and must be replaced after every event.

Several permanent and robust TDR-based scour monitor implementations have been disclosed and are in various stages of being patented by Yankielun and Zabilansky, these include: U.S. Pat. No. 5,784,338: "Time Domain Refectometry System for Real-Time Bridge Scour Detection and Monitoring"; and U.S. Pat. No. 5,790,471: "Water/Sediment Interface Monitoring System Using Frequency-Modulated Continuous Wave". The time-domain technique has a preferred implementation, which utilizes an umbilical cable to communicate data to an on-shore measurement instrument and data acquisition, but can alternatively by implemented using wireless radio telemetry to communicate data. The FM-CW system has a preferred implementation that transmits data to a remote acquisition and analysis system via wireless radio telemetry, but can alternatively be implemented using a coaxial cable to transfer data. Both of these sensors are high-resolution (Approximately 2 cm) scour measurement devices. While these devices provide high-resolution data when used in sand and gravel based sediments, they are ineffective when used in consolidated (clay-based) and otherwise lossy soils. When emplaced in lossy soils the electromagnetic pulse that normally travels down and back the length of the sensor is severely attenuated in the soil. Thus, little or no pulse reflection from material boundaries (soil/water and end of probe) is detected. It is estimated that approximately half of all riverene sites have sediments in which the earlier prove implementation would be severely impacted or rendered completely useless.

SUMMARY OF THE INVENTION

The present invention is a sensor for detecting and monitoring scour in sediment positioned beneath a body of water which includes a probe that is at least partially embedded in the sediment. The sensor electronics, which includes a reflectometer, a battery supply and a telemetry transmitter to display an interface boundary between the water and the transmitter, are superimposed on the probe. Such scour sensors will operate under lossy sediment condition and take-full advantage of our prior art (U.S. Pat. No. 5,784,338: and U.S. Pat. No. 5,790,471). These technologies will be exploited in a reconfigured probe format to provide valuable dynamic sediment transport information in lossy sediment environments where the prior art would have proven otherwise ineffective. Additionally, these two sensor configurations will successfully operate in non-lossy sediments. These sensors are robust alternatives that can be deployed either individually or in an economical and easily implemented multi-sensor multiplexed or individually monitored array. This probe can be implemented in at least two manners; using conventional time domain reflectometry (TDR) or using a frequency modulated continuous wave (FM-CW) technique.

BRIEF DESCRIPTION OF THE DRAWINGS

Other objects, features and advantages of the present invention will become apparent upon reference to the following description of the preferred embodiments and to the drawing, wherein corresponding reference characters indicate corresponding parts in the drawing and wherein.

DETAILED DESCRIPTION OF THE PREFERRED EMBODIMENT

TDR Theory

Figure 1:
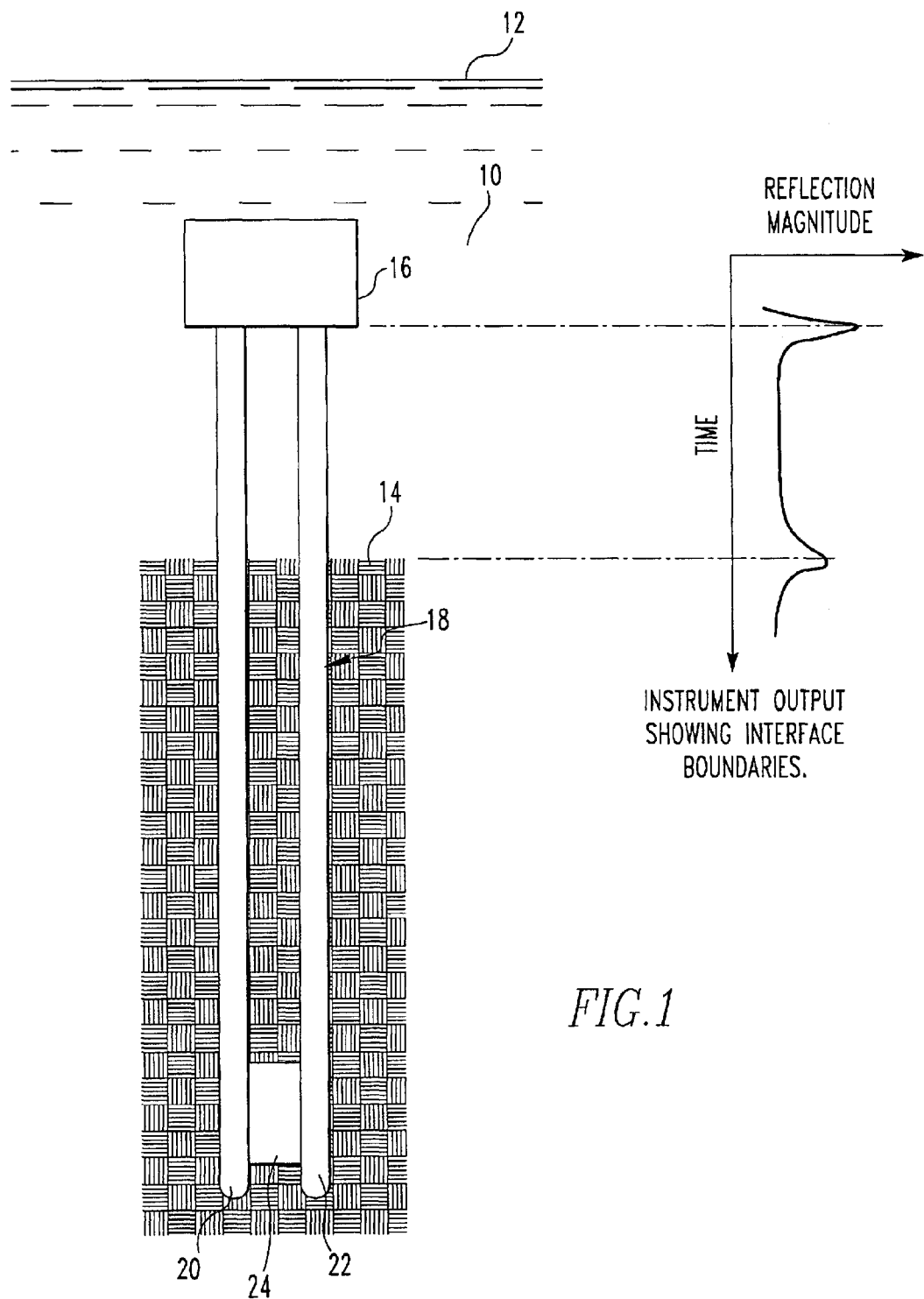
FIG. 1 is a schematic side view of an apparatus representing a preferred embodiment of the present invention along with a graph of instrument output showing interface boundaries.

For this invention, an instrument called a Time Domain Reflectometer (TDR) is directly connected to a parallel transmission line consisting of a pair of robust, specially fabricated non-corroding rods or pipes. The principle of TDR is widely known, described in the technical literature, and applied to numerous measurements and testing applications. This technique was applied to scour detection and monitoring in U.S. Pat. No. 5,784,338: "Time Domain Refectometry System for Real-Time Bridge Scour Detection and Monitoring", (Yankielun and Zabilansky, 1998). TDR Operates by generating an electro-magnetic pulse (or fast rise time step) and coupling it to a transmission line. That pulse propagates down the transmission line at a fixed and calculable velocity, a function of the speed of light and the electrical and physical characteristics of the transmission line. The pulse will propagate down the transmission line until the end of the line is reached and then will be reflected back toward the source. The time, t in seconds that it takes for the pulse to propagate down and back the length of the transmission line is called the "round trip travel time" and is calculated as:

$$t = 2L/v \quad (1)$$

where:
L=length of the parallel metal rod sensor (m)
v=velocity of propagation (m/s)
The propagation velocity can be given as:

$$v = c/(\in^{1/2}) = c/n \quad (2)$$

where:
c=velocity of light in free space ($3 \times 10^8$ m/s).
$\in$=the relative dielectric constant of the medial surrounding the transmission line.
n=index of refraction of the media surrounding the transmission line.

For a two wire parallel transmission line, changes in the dielectric media in the immediate surrounding volume will cause a change in the round trip travel time. Freshwater has an $\in$=88; ice has an $\in$=3.17; dry sedimentary materials (e.g.: soil, gravel and stone) have an $\in$ in the range of 5 to 8. Wet sediment has a dielectric constant, which is a mixture of those of water and dry soil. The $\in$ of this mixture will vary depending upon the local sedimentary material constituency, but in all cases the bulk dielectric (bulk index of refraction) of the mixture will be less than that of liquid water alone and significantly greater than that of the dry sedimentary materials. Some sediment materials, particularly clay-based sediments, can be extremely lossy. This lossy behavior of the soil is exhibited by a severe attenuation of an electromagnetic pulse as it propagates along a transmission line surrounded by such materials.

At any boundary condition along the transmission line (e.g.: air/water and water/sediment), a dielectric discontinuity exists. As a pulse traveling down the transmission line from the TDR source encounters these boundary conditions, a portion of pulse energy is reflected back to the source from the boundary; a portion of the energy continues to propagate through the boundary until another boundary or the end of the cable causes all or part of the remaining pulse energy to return along the transmission line towards the source. Measuring the time of flight of the pulse and knowing the dielectric medium through which the pulse is traveling permits calculation of the physical distance from the TDR source to each of the dielectric interface boundaries encountered.

For lossy consolidated soils like clay, the electromagnetic signal is greatly attenuated as it propagates along the imbedded transmission line. Levels of signal attenuation can be as much as 10's of dB per m. This results in little or no reflected signal returned to the instrument over the length of the probe buried in the lossy media. If the sensor source is imbedded in the lossy media along with a portion of the sensor probe, all of the output pulse energy would be absorbed by the media and no reflection signal returned. If a pulse is propagating along a transmission line imbedded in a non- or minimally-lossy material and a boundary with some extremely lossy material is encountered, a reflection will occur at the interface boundary, similarly to that that would occur for a boundary between tow non-lossy materials. The magnitude of the reflection will be proportional to the reflection coefficient based on the two materials at the interface. These conditions are also valid if the probe is of the FM-CW variety.

FM-CW Theory

The frequency modulated continuous wave (FM-CW) technique has been long applied to radar system applications and is well documented in the literature. Here, instead of launching electromagnetic waves from an antenna into free space, as would be done in a radar application, we couple these waves to a transmission line (parallel line, coaxial cable, transmission line-based sensor, etc.). This technique was applied to scour detection and monitoring U.S. Pat. No. 5,790,471: "Water/Sediment Interface Monitoring System Using Frequency-Modulated Continuous Wave", (Yankielun and Zabilansky, 1998).

In a FM-CW system, a steady amplitude signal whose frequency increases linearly with time is transmitted down a transmission line. (While for the vast majority of applications the linear frequency-time relationship is employed, conceivably there are applications where a sinusoidal, exponential, logarithmic or other frequency-time relationship may be useful.) The FM-CW signal is produced by a voltage controlled oscillator (VCO) driven by a linear ramp generator. The signal, coupled to the transmission line, propagates down the line and is reflected form the far end (or intermediate discontinuity), returning to the source, delayed by the round-trip propagation time, $2t_p$. This returning waveform is mixed with a sample of the VCO output that is fed directly to the mixer with a minimal. But known delay. The mixing process produces sum $\Sigma f$ and difference $\Delta f$ frequency spectra. Low passing filtering is applied to retain only $\Delta f$. Within $\Delta f$, one component $F_D$, is proportional to the distance to the end of the parallel transmission sensor, D, and can be determined using spectral analysis techniques. For a transmission line surrounded by a homogenous dielectric medium with a refractive index n, D is found from:

$$D(m) = \frac{(F_D)(t_{swp})c}{2(BW)(n)} \quad (3)$$

where
$F_D$=difference frequency due to transmission line impedance Discontinuity reflection (Hz)
$t_{swp}$=FM-CW sweep time (s)
c=velocity of light in a vacuum (m/s)
BW=FM-CW swept bandwidth (Hz)

The difference frequency spectra usually lie in the audio range. The spectra has a similar appearance to a time domain reflectometry (TDR) scan and can be calibrated as such with distance, D, related to the round-trip travel time, t, by:

$$t = (2Dn)/c \quad (4)$$

A typical implementation of an FM-CW transmission line sensor system consists of several electronic components. A sweep generator, consisting of a linear ramp generator and voltage controlled oscillator (VCO) is used to create the necessary signal for this implementation. The linear ramp generator is used to periodically drive a rf voltage controlled oscillator (VCO) with sufficient swept bandwidth to provide the required resolution (typically 100 to 1000 MHz of bandwidth). The output of this sweep generator is coupled to the transmission line through a circulator (or "T", "Magic T", power splitter or similar device) that permits signal flow from the VCO directly to the transmission line. The swept signal propagates down the transmission line, reaches the distal end and is reflected back to the circulator. At the circulator, the reflected signal is routed to the mixer diode. There it is mixed with the leakage signal that has propagated across the short path between the VCO and the mixer. The resulting output of the mixer consists of a high frequency signal, $\Sigma f$, and a low frequency, audio-range difference signal, $\Delta f$. The rf low-pass filter (LPF) passes $\Delta f$ and attenuates $\Sigma f$ to a level making it inconsequential. The signal is filtered through an audio high-pass filter (HPF) to remove DC and low-frequency audio components associated with near-end terminal reflections. An audio amplifier may be installed to increase the level of the signal as appropriate for subsequent signal processing. This signal can be directly processed, analyzed and stored or displayed. Alternatively, this signal can be transmitted to a remote location over twisted pair, coaxial cable, radio or other form of telemetry, where it then cam be processed, analyzed, etc.

There are several methods by which the resulting audio signal may be processed to provide useful information. It can directly be viewed on an audio-frequency spectrum analyzer spectrum where the spectral peaks indicate the interface boundaries. Using a personal computer, it can be digitized and processed by a FFT (fast Fourier transform) algorithm, resulting in a power spectrum where the spectral peaks indicate the interface boundaries. Another alternative processing method relies on a bank of tuned, narrowband, closely spaced in center frequency, audio band-pass filters (BPF), each interfaced to a light emitting diode (LED) where the progression of illuminated LEDs indicate the depth of scour.

Transmission Line Theory

To minimize the pulse energy reflected by the coaxial cable/probe interface boundary for the TDR implementation (or the electronics package in the FM-CW implementation), thus permitting a greater portion of the pulse energy to propagate along the sensor through the surrounding water and sediments, there must be a close impedance match at the transmission line interface. Impedance matching can be accomplished in two ways: using an impedance transformer, or by designing the physical dimensions of the sensor to ensure an impedance match. Here, for simplicity of fabrication, we have chosen the latter method. The characteristic impedance, $Z_o$, of a parallel transmission line can be calculated by:

$$Z_0 = \frac{120}{\sqrt{\varepsilon}} \cosh^{-1}\left(\frac{d}{2a}\right) \quad (5)$$

where a=radius of the conductors and d=center-to-center distance between the parallel conductors. We designed the probe to have a $Z_o$=25 $\Omega$ when immersed in water. The resulting mismatch with the 50 $\Omega$ coaxial cable provides about 3.5 dB of loss, but also produces the necessary reference signal delineating the coaxial cable to sensor rod interface. This impedance will change as the dielectric medium (water or water/sediment mix) surrounding the sensor changes; however, this is not expected to significantly affect the ability of the probe to clearly delineate the interface boundaries necessary to calculate scour depth. In this implementation, we are most concerned with an impedance match for the section of the probe, from the top down, this is surrounded by water alone.

Implementation

In a departure from earlier implementations where the electronic components were located at the bottom of the sensor, buried deeply in the sediments, this probe is buried with the TDR or FM-CW electronics at the top of the probe, Referring to FIG. 1, water 10 having a water surface 12 is positional over sediment 14. Sensor electronics 16 positioned in a suitable housing is superimposed on a probe generally at 18. This probe 18 is composed of parallel tubes 20 and 22, which are embedded into the sediment 14 and which are connected by structural member 24. Here, with the probe completely buried by sentiments, the electronics is the first component of the probe to become unburied during a scour event. The instrument can also be installed so that the electronics and a portion of the probe is above the surface of the sediment so that deposition events can be monitored as well as scour events. This probe, when completely covered by consolidated soils provides no boundary interface information since all of the sensor signal is attenuated by the lossy soil. As sediments are cleared away from around the probe by the river currents, the probe will become partially uncovered. Once the probe electronics and an initial length of the transmission line sensor become uncovered from the sediment and surrounded only by water, the probe will begin to output an electronic signal indicating the exposed length of the probe. Depending on the chosen implementation, a coaxial cable, carrying both TDR signal, and in some applications, DC power for TDR electronics, is appropriately routed from the sensor to an on-shore or bridge superstructure location. Alternatively, in the FM-CW implementation (although also possible for some variety of TDR-based implementation) the signal is transmitted to shore using wireless radio telemetry.

The sediment monitor probes are constructed from a durable metal such as steel, or preferably a non-corrosive metal like stainless steel, brass or bronze. The physical dimensions of the probe are designed to be mechanically robust to withstand the forces of mechanical insertion into the river bottom sediments, the drag forces of river currents and occasional impacts by debris or rubble ice. They are also physically dimensioned for efficient electromagnetic operation as a transmission line. The dimensions of the transmission line portion of the probe can be varied, depending on the application; however, in typical applications the transmission line component of the probe consisted of two parallel lengths of 3 cm diameter pipes spaced 9 cm center-to-center. The length of the transmission line sensor can be made any appropriate length as required for a particular application, but typically may be 1 to 2 meters in length. The top end of the transmission line probes are connected to the system electronics or cable termination and sealed in a watertight enclosure.

Figure 2B:
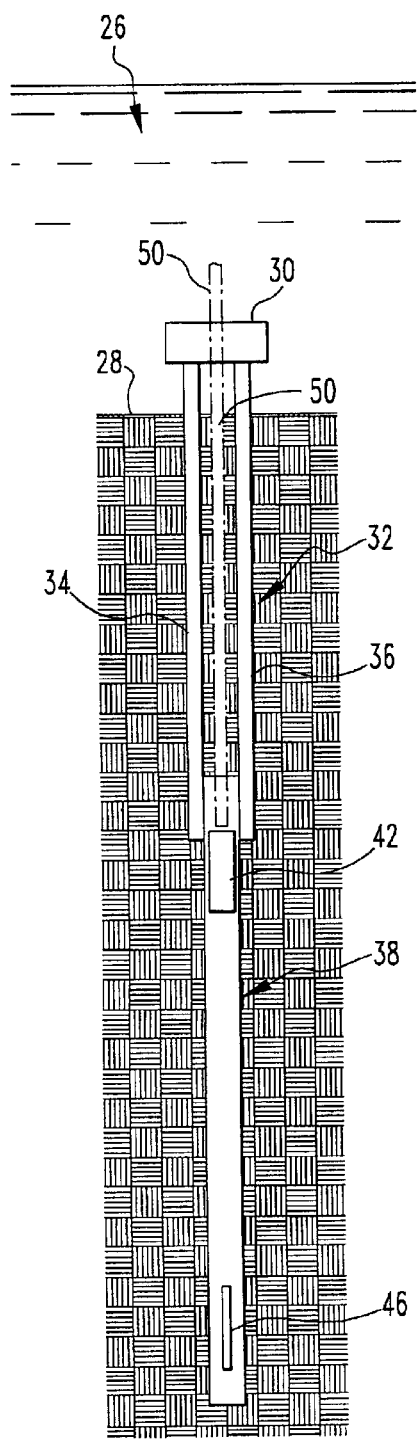
FIGS. 2a and 2b are respectively side and end views of the apparatus shown in FIG. 1 using an FM-CW sediment monitor.
Figure 2A:
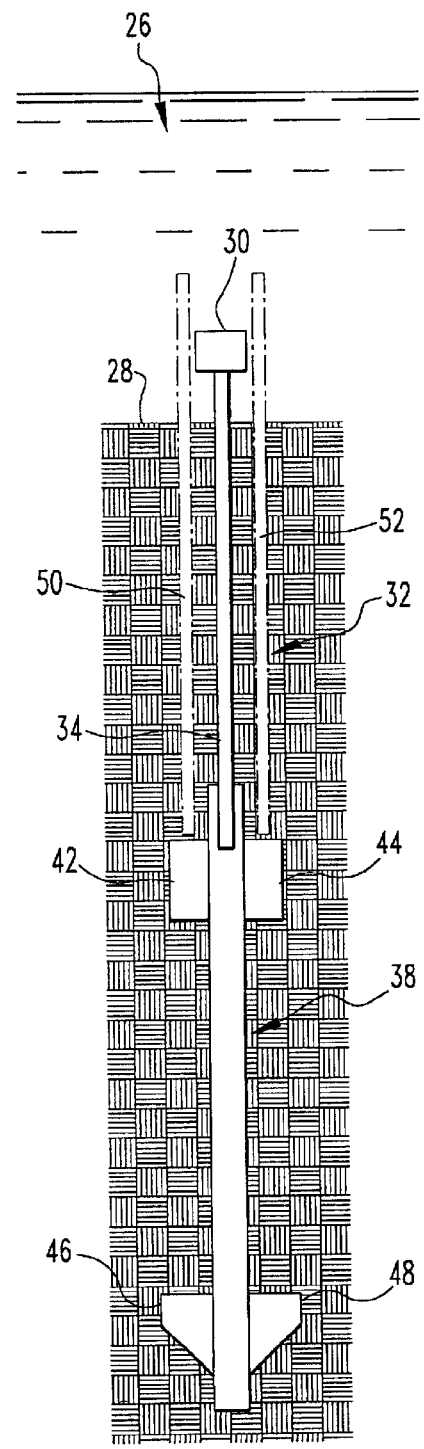

Referring to FIGS. 2a and 2b, water 26 is positioned over sediment 28. Sensor electronics 30 in a suitable housing is positioned atop a probe generally at 32. The probe 32 is comprised of parallel tubes 34 and 36, which are joined by a lower anchor generally at 38. The anchor is comprised of an anchor body 40, a pair of upper opposed air line and mechanical connection flanges 42 and 44 and a pair of lower opposed lateral support fins 46 and 48. There are also a pair of lateray placement pipes 50 and 52, which connect to the flanges 42 and 44 for placement of the probe. For a FM-CW implementation, this enclosure contains all the necessary electronics for the FM-CW reflectometer, battery supply and telemetry transmitter.

Figure 3B:
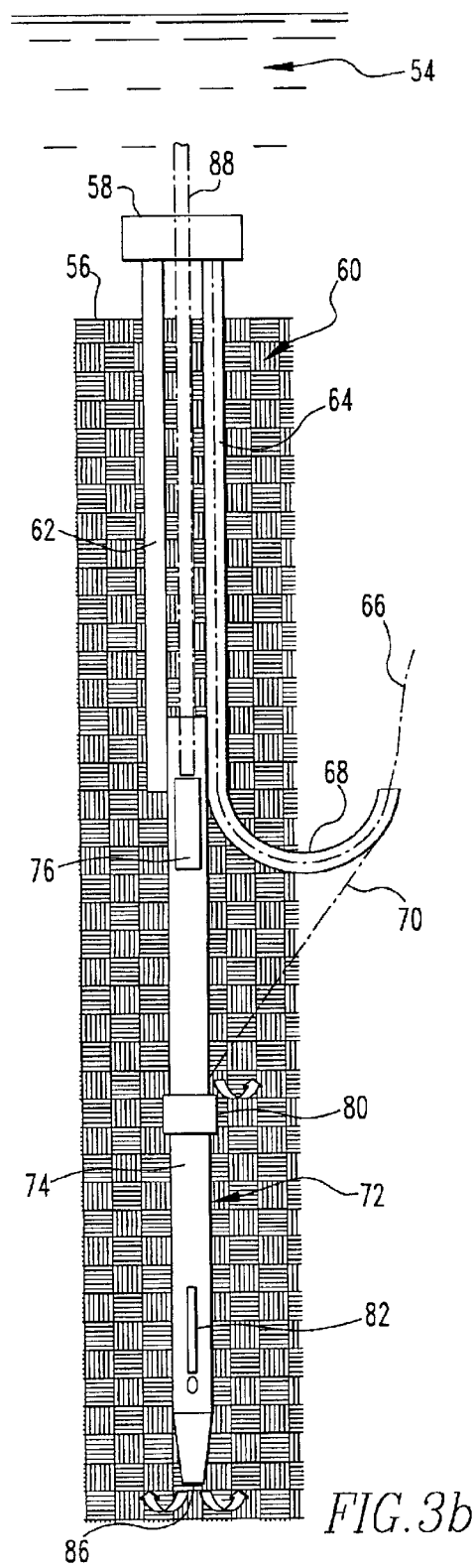
FIGS. 3a and 3b are respectively side and end views of the apparatus shown in FIG. 1 using a TDR sediment sensor.
Figure 3A:
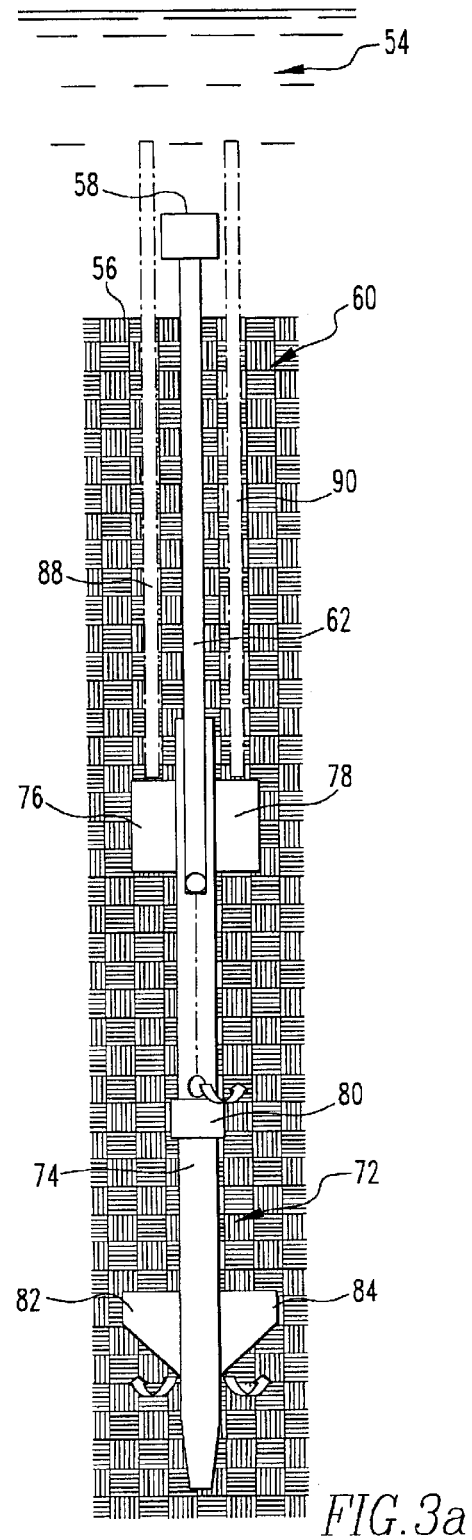

Referring to FIGS. 3a and 3b, water 54 is positioned over sediment 56. Sensor electronics 58 is superimposed on a probe generally at 60. The probe is comprised of parallel tubes 62 and 64 and a coaxial cable 66, which extends from a cable strain relief 68 to the surface (not shown). The cable system also includes a cable guide with support gusset 70. Connecting tubes 62 and 64 there is a lower anchor generally at 72. The anchor 72 includes an anchor body 74, a pair of opposed air line and mechanical connection flanges 76 and 78, a pipe coupling 80 for extending the probe and lower lateral fins 82 and 84. At the base of the anchor there is also a lower fluid exit opening 86. Placement pipes 88 and 90 for conducting air or water to placement of the probe are connected to upper flanges 76 and 78. For the cable-connected TDR implementation, the housing contains the termination of a coaxial cable to the transmission line probe ends. This coaxial cable is routed through one of the pipes forming the transmission line probe down and through the gusseted cable guide. It is preferable to have the coaxial cable routed through the pipe that is connected to the coaxial shield; preventing unwanted electromagnetic interactions between the probe and connecting coaxial cable. This guide and support permits the TDR-based system's coaxial cable umbilical to be inserted into the sediments without crimping or otherwise damaging the cable. A strain relief is provided at the end of the support to prevent pullout of the cable from the sensor.

For both implementations, near the junction between the transmission line sensor pipes and the anchor tube, are mounted two smaller hollow tubes that act as sockets for temporary connection of the probe to a fixture for mechanical driving. These same two sockets act as nozzles if an air-jetting insertion technique is used for sensor installation into the sediments. Depending on the chosen installation method, a special mechanical or pneumatic installation fixture is temporarily attached to these two tubes. This fixture is disconnected from the sensor and withdrawn to the surface upon completion of installation.

The bottom end of the transmission line probe is electrically shorted (typically welded or brazed) to an anchor tube that holds the sensor in a vertical position in the sediment. This hollow anchor tube (cylindrical or rectangular cross-section) is of a length sufficient to securely anchor the sensor into the sediments well below the maximum expected depth of the scour. Alternatively, an "I" beam shaped member can be substituted for the anchor tubing. For structural support, the tube is typically of larger diameter than either of the transmission line sensor pipes. Lateral support fins extend from the bottom of the anchor tube to further anchor and support the probe in the surrounding sediments.

Applications

The cable-based TDR system is primarily intended for long-term or permanent monitoring situations where the umbilical coaxial cable can be easily and more permanently installed. An FM-CW based implementation, using batteries and a wireless telemetry link, in intended for shorter-term applications where the probe can be retrieved, perhaps annually, for refurbishing and replacement of batteries.

In practical installation, the scour system is buried in river bottom sediments and anchored at a point below the maximum expected depth of scour. The robust probe is designed to be buried by either "air jetting" or by being "pile driven" into the sediments. The top of the probe is "surveyed in" relative to a local survey benchmark.

Following installation, an initial reference reading is made of the probe signal response and the round trip travel time for a pulse propagating along each transmission line sensor is calculated and stored in the associated computer. Subsequent probe signal responses and round-trip propagation times are frequently and automatically (or manually) acquired, calculated and compared with the original reference data set. A real-time computer algorithm can be used to compare the reference round-trip travel time with subsequent values, trigger an alarm when a significant change is observed in the probe signal response or a threshold difference in round trip travel time is reached. Depending on the desired implementation, an automatic, electronic multiplexer can be arranged with the instrument to monitor a sensor array consisting of numerous probes installed in close proximity to a structure of interest.

There are several advantages to the implementation of the scour detection and monitoring apparatus for use in lossy soils which includes the fact that the following are facilitated:

1. Sediment transport measurements in riverbeds with lossy soils.
2. Sediment transport measurements in riverbeds with sand, gravel and stone consistuency.
3. Scour measurements beneath ice cover.
4. Scour measurements under floating debris.
5. Scour measurements during high-energy flow conditions.
6. Robust construction.
7. Remote monitoring.
8. Minimum user interface.
9. No moving of mechanical components.
10. Low maintenance.
11. Simple installation.
12. Real-time monitoring and alarming.
13. Automatically re-settable sensor.

It will also be appreciated that the implementation of the scour detection and monitoring system for use in lossy soils of this invention solves the following problems for industrial, commercial and municipal users:

1. Sediment transport measurements in riverbeds with lossy soils (e.g., clay-based).
2. Sediment transport measurement in riverbeds with sand, gravel and stone constituency.
3. Simple in-field operation.
4. Scour measurements beneath ice cover.
5. Scour measurements under floating debris.
6. Scour measurements during high-energy flow conditions.
7. Real-time monitoring/alarming of severe scour conditions and/or foundation failure.
8. Around-the-clock, year-round monitoring of scour conditions.

In addition to being useful for monitoring of industrial, commercial and municipal infrastructures, especially bride piers and docks. Other applications include:

1. Sediment monitoring along submerged utility lines and pipes.
2. Navigation channel sedimentation monitoring.
3. Sediment deposition near intakes or outfalls.
4. Monitoring of transport of toxic/hazardous sediments.

It will finally be appreciated that a system has been described, which allows for sensor operation in consolidated, lossy, clay-based sediments. Low cost sensors and instrumentation may also be used. The system is also able to carry out bridge scour monitoring and infrastructure-related sediment transport monitoring. An automatic alarming capability for use in severe scour conditions or foundation failure are also possible. It will also be appreciated that a non-sacrificial sensor, i.e. a sensor which is not destroyed in the monitoring process, can be used continuously monitor numerous scour and deposition cycles.

While the present invention has been described in connection with the preferred embodiments of the various elements, it is to be understood that other similar embodiments may be used or modifications and additions may be made to the present described embodiment for performing the same function of the present invention without deviating therefrom. Therefore, the present invention should not be limited to any single embodiment, but rather construed in breadth and scope in accordance with the recitation of the appended claims.

What is claimed is:

1. A system, at least part of which is buried as a probe, for instantaneously detecting a level of scour, in particular, scour about a structure that may be at least partially submerged in water, comprising:
    at least one first conductor of electromagnetic energy having a characteristic impedance, a source end, a distal end configured to have an impedance different from said characteristic impedance, and a length much greater than any of said first conductor's other dimensions,
wherein at least part of said at least one first conductor is buried as part of said probe;
    at least one electromagnetically conducting ground plane electromagnetically isolated from and adjacent said at least one first conductor,
wherein at least part of said at least one electromagnetically conducting ground plane may be buried as part of said probe; and
    at least one sub-system, in operable communication with said source end of said first electromagnetic conductor, for providing analog signals to and processing analog signals from said at least one first conductor, said processing to include capturing reflections of said analog signals from said at least one first conductor,
wherein at least part of said at least one sub-system may be buried integral with and atop said probe,
wherein said processing yields information for decision making, and
wherein said system is particularly suited for use in lossy soils.

2. The system of claim 1 in which said first conductor is a transmission line.

3. The system of claim 2 in which said transmission line is selected from the group consisting of: electrically conductive rods, pipes, tubes, and combinations thereof.

4. The system of claim 1 in which said sub-system comprises at least one time domain reflectometer (TDR).

5. The system of claim 4 in which said TDR comprises:
    at least one signal generator for providing pulsed analog electromagnetic signals as said signals;
    a circulator in operable communication with said at least one signal generator for coupling said pulsed analog electromagnetic signals to said at least one first conductor and coupling said reflections from said conductor to said TDR; and
    a processor for processing said reflections and at least portions of said signals and providing results of said processing.

6. The system of claim 5 in which said processor comprises a personal computer.

7. The system of claim 1 in which said sub-system comprises at least one FM-CW reflectometer.

8. The system of claim 7 in which said at least one FM-CW reflectometer comprises:
    a linear sweep generator for generating said analog signals;
    a circulator in operable communication with at least said linear sweep generator for coupling said analog signals to said at least one first conductor and coupling said reflection from said conductor to said FM-CW reflectometer;
    a mixer in operable communication with said circulator for combining said at least one reflection with a portion of said analog signal to yield a first output signal;
    a low pass filter in operable communication with said mixer for passing only the low frequency spectra in said first output signal, yielding a second output signal having a frequency spectra in the audio range;
    a high pass audio filter in operable communication with said low pass filter for passing only the high frequency spectra of said second output signal, yielding a third output signal having a frequency spectra in the high end of the audio range;
    an audio amplifier in operable communication with said high pass audio filter for amplifying said third output signal, yielding a fourth output signal; and
    a processor in operable communication with said audio amplifier for comparing said data on features of said reflected analog signal with at least one reference and displaying results of said comparison,
wherein employment of said FM-CW reflectometer at least partially buried in sediment enables alerting to scour occurring at least at a pre-specified level.

9. The system of claim 1 in which a single said sub-system operates multiple said at least one conductors of electromagnetic energy by multiplexing said analog signals and at least said reflections from said distal end.

10. The system of claim 1 in which said at least one electromagnetically isolated ground plane comprises a second conductor similar to said first conductor, wherein said first and second conductors are disposed in the same plane and parallel at a pre-specified distance one to the other and at least partially buried in a location that may be adjacent said structure.

11. A method for instantaneously detecting a level of scour, in particular, scour about a structure that may be at least partially submerged in water, comprising:
    disposing near said structure at least one transmission line having a characteristic impedance, a source end, and a distal end having an impedance different from said characteristic impedance,
wherein said at least one transmission line is electromagnetically isolated from said structure and is at least partially buried;
    providing at least one electromagnetically conducting ground plane adjacent said at least one transmission line;
    providing at least one analog electromagnetic signal at said source end,
wherein portions of said analog electromagnetic signal are distinguishable over at least pre-specified time intervals;
    receiving at said source end at least one reflection of said at least one analog electromagnetic signal from at least one boundary along said at least one transmission line defined by a change in dielectric coefficient of material surrounding said at least one transmission line; and extracting at least one quantifiable feature from said at least one reflection;
wherein at least one value associated with said at least one quantifiable feature may be compared to at least one reference value to at least detect a pre-specified level of scour that serves to at least partially uncover said at least partially buried transmission line, and wherein said method is particularly suited for use in lossy soils.

12. The method of claim 11 in which said analog electromagnetic signal is a pulsed signal,
wherein each pulse may be simulated using a step function with a fast rise time.

13. The method of claim 11 in which said analog electromagnetic signal is a frequency modulated continuous wave (FM-CW) signal provided on an RF carrier frequency.

14. The method of claim 11 in which said at least one electromagnetically isolated ground plane comprises a second transmission line similar to said first transmission line, wherein said first and second transmission lines are disposed in the same plane and parallel at a pre-specified distance one to the other adjacent at least part of said structure.

15. The method of claim 11 in which said processing provides at least a measure of the time interval for a known portion of said analog electromagnetic signal to travel from said source end to said distal end and return to said source end as at least a partial reflection from said distal end.

16. The method of claim 11 in which said processing further provides at least a measure of the time for a known portion of said analog electromagnetic signal to travel from said source end to at least a first location along the length of said transmission line and the at least partial reflection of at least part of said known portion back to said source end, wherein said at least a first location is defined by the closest boundary to said source end of a first region around said transmission line, said first region incorporating at least one material other than the medium surrounding said transmission line in a reference at least partially buried state.

17. The method of claim 11 in which said processing further employs an algorithm to extract said at least one feature.

18. The method of claim 11 further comparing said at least one feature of said at least one reflection to at least one reference to yield additional information for decision making.

19. The method of claim 18 in which said additional information is selected from the group consisting of: depth of burial of said probe, location of scour relative to said structure, amount of material scoured from adjacent said structure, rate of accumulation of scour occurring adjacent said structure, and combinations thereof.

20. The method of claim 11 further providing for conveying said information for decision making to a decision maker.

21. The method of claim 11 further providing for displaying said at least one quantifiable feature directly on an audio-frequency spectrum analyzer,
wherein spectral peaks may be correlated to said at least one quantifiable feature.

22. The method of claim 11 further providing for digitizing said reflected signal and processing it using a Fast Fourier Transform (FFT) algorithm,
wherein said processing yields a power spectrum from which said one quantifiable feature may be identified and displayed on a computer.

23. The method of claim 11 further providing for displaying said at least one quantifiable feature by extracting it via a bank of tuned, narrowband, audio band-pass filters (BPF) that are closely spaced in center frequency, interfacing each of said filters to a light emitting diode (LED), and correlating the number of said LEDs that are lit to said at least one quantifiable feature.

* * * * *